United States Patent
Sohn (10) Patent No.: US 9,552,119 B2
(45) Date of Patent: Jan. 24, 2017

(54) TOUCH WINDOW

(71) Applicant: LG INNOTEK CO., LTD., Seoul (KR)

(72) Inventor: Dong Woo Sohn, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/605,588

(22) Filed: Jan. 26, 2015

(65) Prior Publication Data

US 2015/0212624 A1 Jul. 30, 2015

(30) Foreign Application Priority Data

Jan. 28, 2014 (KR) .................. 10-2014-0010737

(51) Int. Cl.
*G06F 3/044* (2006.01)

(52) U.S. Cl.
CPC ...... *G06F 3/044* (2013.01); *G06F 2203/04111* (2013.01); *H04M 2250/22* (2013.01)

(58) Field of Classification Search
CPC ........... G06F 3/044; G06F 2203/04111; H04M 2250/22
USPC .................... 178/18.01–19.07; 345/173–178
See application file for complete search history.

(56) References Cited

U.S. PATENT DOCUMENTS

2009/0309850 A1* 12/2009 Yang .................. G06F 3/044
345/174
2012/0154312 A1 6/2012 Huang et al.
2013/0147742 A1 6/2013 Lee .............................. 345/173
2013/0155011 A1 6/2013 Kim et al.
2013/0181938 A1 7/2013 Takashima et al.

FOREIGN PATENT DOCUMENTS

| EP | 2 565 758 A2 | 3/2013 |
| KR | 10-2013-0059118 A | 6/2013 |
| KR | 10-2013-0066395 A | 6/2013 |
| TW | 201227458 | 7/2012 |
| TW | 201328475 | 7/2013 |
| TW | 201330070 | 7/2013 |

OTHER PUBLICATIONS

European Search Report dated Jun. 3, 2015 issued in Application No. 15151926.1.
Taiwanese Office Action dated Jul. 7, 2016 issued in Application No. 104101759 (with English Translation).

* cited by examiner

*Primary Examiner* — Michael Pervan
(74) *Attorney, Agent, or Firm* — KED & Associates, LLP (57) ABSTRACT

A touch window includes a cover substrate including a first area for the display of a screen image and a second area at an edge of the first area, a sensing electrode to sense a touch position in the first area, a printing layer in the second area, an instruction icon in the second area with a step difference from the printing layer, and an instruction sensing electrode to recognize a touch position of the instruction icon. The instruction sensing electrode includes a first instruction sensing electrode, and a second instruction sensing electrode to form a capacitor with the first instruction sensing electrode. The first instruction sensing electrode includes a first sub-electrode and a second sub-electrode spaced apart from the first sub-electrode while forming a space part therebetween, and the first and second sub-electrodes are connected with each other at an outer portion of the instruction icon.

19 Claims, 11 Drawing Sheets

TOUCH WINDOW

CROSS-REFERENCE TO RELATED APPLICATION

This application claims priority under 35 U.S.C. §119 to Korean Application No. 10-2014-0010737 filed on Jan. 28, 2015, whose entire disclosure is incorporated herein by reference.

BACKGROUND

1. Field

The disclosure relates to a touch window.

2. Background

A touch panel is installed on a display surface of an image display device, such as a cathode ray tube (CRT), a liquid crystal display (LCD), a field emission display (FED), a plasma display panel (PDP), and an electro-luminescence device (ELD), so that a user inputs predetermined information into a computer by pressing the touch panel while viewing the image display device.

The touch panel has a bonding structure including various layers. In general, the touch panel has a structure in which a transparent window provided at the uppermost layer is bonded to a sensing electrode layer (ITO) having a single layer structure or a multi-layer structure, which is provided under the transparent window, through an adhesive material (OCA).

An additional instruction icon is formed on the touch panel for user convenience. When a sensing electrode is formed on the instruction icon, the quality of the sensing electrode may be degraded due to the step difference from the instruction icon. In other words, the sensing electrode on the instruction icon may be disconnected.

BRIEF DESCRIPTION OF THE DRAWINGS

The embodiments will be described in detail with reference to the following drawings in which like reference numerals refer to like elements wherein.

DETAILED DESCRIPTION

Figure 1:
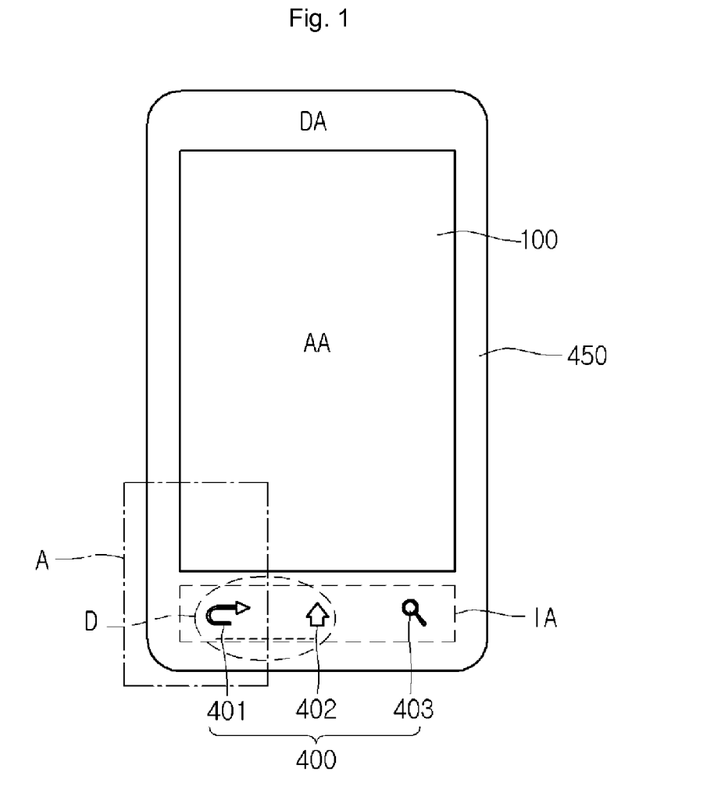
FIG. 1 is a plan view schematically showing a touch window according to the embodiment.
Figure 2:
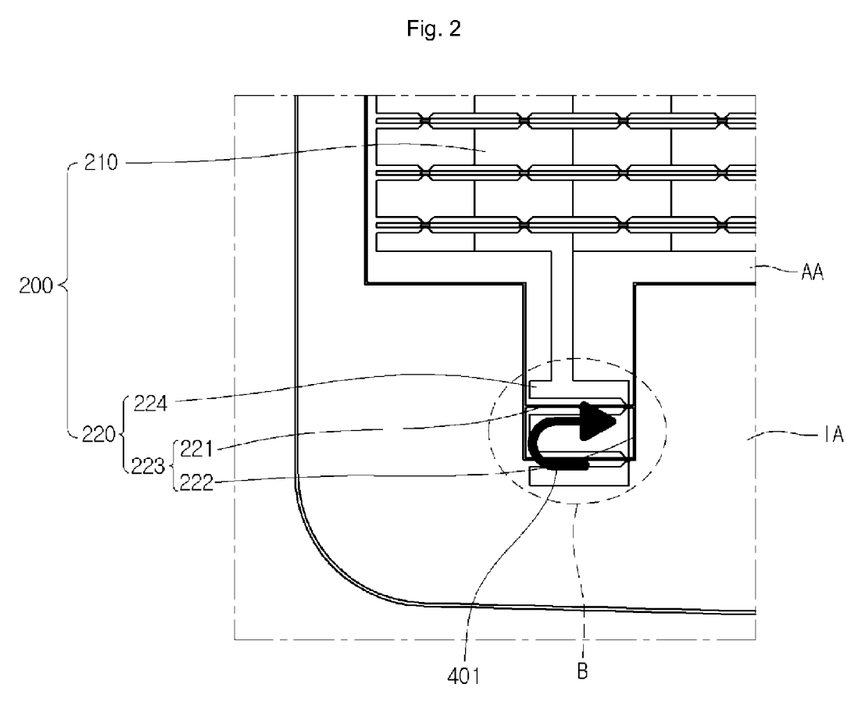
FIG. 2 is an enlarged view showing a part A of FIG. 1.
Figure 3:
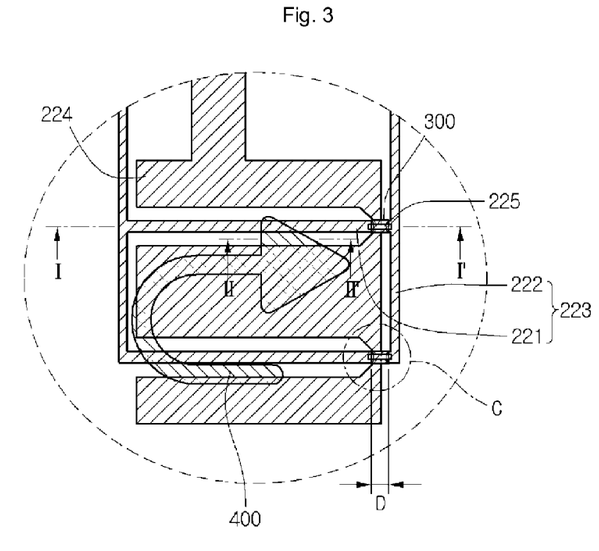
FIG. 3 is an enlarged view showing a part B of FIG. 2.

Referring to FIGS. 1 and 2, a touch window according to a first embodiment may a cover substrate 100 including a first area AA, a second area DA, and a third area IA, an electrode 200, and an instruction icon 400. The cover substrate 100 may include glass or plastic. For example, the cover substrate 100 may include strengthened glass, half-strengthened glass, sodalime glass or strengthened plastic, but the embodiment is not limited thereto. The cover substrate 100 may include various materials sufficient to support the electrode 200 and the instruction icon 400 formed thereon. The cover substrate 100 may include the first area AA, the second area DA, and the third area IA.

The first area AA refers to an area in which a touch instruction of a user may be input. In other words, the first area AA refers to an area in which a screen image may be displayed and a touch may be sensed.

The second area DA may surround the first area AA. The second area DA is arranged at an outer portion of the first area AA. An external circuit, which is connected with a wire, may be positioned in the second area DA. In other words, the second area DA is provided at an edge of a screen image area so that the screen image may not be displayed on the second area DA.

A printing layer 450 may be provided on the second area DA. The printing layer 450 may be coated with a material representing a predetermined color so that a wire or a printed circuit board to connect the wire to an external circuit is not recognized from an outside. The printing layer 45 may have a color suitable for a desired outer appearance. For example, the printing layer 450 may include a black pigment to represent a black color. The printing layer 450 may be formed through a depositing, printing or wet coating scheme.

The third area IA is provided at a portion of the second area DA. For example, as shown in FIG. 1, the third area IA may be provided at a lower end of the second area DA. In other words, the third area IA is an area provided at an edge of a screen image area and having the instruction icon 400 arranged therein. The third area IA receives light LEDs provided at a rear surface of the instruction icon 400, so that the user can easily distinguish among the instruction icons to input instructions.

As shown in FIG. 1, the instruction icon 400 may include a first instruction icon 401, a second instruction icon 402, and a third instruction icon 403. However, the embodiment is not limited thereto, and instruction icons 400 may be formed in various shapes or various numbers. The electrode 200 is provided in the first area AA and the third area IA. The electrode 200 includes the sensing electrode 210 and the instruction sensing electrode 220. The first area AA is provided therein with a sensing electrode 21 to recognize a touch instruction input into a screen image area, and the third area IA is provided therein with an instruction sensing electrode 220 to recognize a touch position of the instruction icon 400.

In detail, a sensing electrode pattern may include one sensing electrode pattern formed in a first direction and another sensing electrode pattern formed in a second direction. The sensing electrode pattern is densely formed on an entire surface of the first area AA of the first cover substrate 100.

One sensing electrode may be a driving electrode to supply power, and another sensing electrode may be a sensing electrode to recognize a touch. However, for the explanation convenience, one sensing electrode and another sensing electrode are collectively called sensing electrodes in that all sensing electrodes sense a touch.

The one sensing electrode pattern and the another sensing electrode pattern may be formed through various schemes depending on the structure of the touch panel.

For example, the one sensing electrode pattern and the another sensing electrode pattern may be formed together on one surface of the cover substrate 100. As an another example, the one sensing electrode pattern may be formed on one surface of the cover substrate 100, and the another sensing electrode pattern may be formed on one surface of a substrate provided on the cover substrate 100.

The one sensing electrode pattern may be also formed on one surface of a first substrate provided on the cover substrate 100, and the another sensing electrode pattern may be formed on a second substrate provided on the first substrate. An optical clear adhesive may be additionally provided among the cover substrate 100, the first substrate, and the second substrate.

The one sensing electrode pattern may be also formed on one surface of glass or a film provided on the cover substrate 100, and the another sensing electrode pattern may be formed on an opposite surface of the glass or the film.

The touch window according to the embodiment may have various structures depending on positions in which the one sensing electrode pattern and the another sensing electrode pattern are formed. However, the embodiment is not limited thereto, and the one sensing electrode pattern and the another sensing electrode pattern may be formed at various positions.

The electrode 200 includes the sensing electrode 210 provided in the first area AA and the instruction sensing electrode 220 provided in the third area IA. The sensing electrode 210 may have a first pattern, and the instruction sensing electrode 220 may have the second pattern. The first and second patterns may include differently shaped patterns.

A portion of the instruction sensing electrode 220 may be overlapped with a portion of the instruction icon 400. A portion of the instruction sensing electrode 220 may be overlapped with a portion of the instruction icon 400.

Referring to FIGS. 2 to 7, the instruction sensing electrode 220 provided in the third area IA may include a first instruction sensing electrode 223 and a second instruction sensing electrode 224 to form a capacitor together with the first instruction sensing electrode 223. The second instruction sensing electrode 224 extends from the sensing electrode 210 provided in the first area AA so that the second instruction sensing electrode 224 may be provided in the third area IA, and may have a pattern extending in a longitudinal direction.

The first instruction sensing electrode 223 may be separated from the sensing electrode 210 provided in the first area AA, and may have a pattern extending in a transverse direction.

The first instruction sensing electrode 223 may include a first sub-electrode 221 and a second sub-electrode 222 spaced apart from the first sub-electrode 221 while interposing a space part D between the first and second sub-electrodes 221 and 222. The first sub-electrode 221 may extend from one side of the instruction icon 400 to an opposite side of the instruction icon 400 across the instruction icon 400. A portion of the first sub-electrode 221 may be overlapped with a portion of the instruction icon 400. A portion of the first sub-electrode 221 may make contact with the instruction icon 400. The first sub-electrode 221 is provided on the printing layer 450 and the instruction icon 400 to cross a step difference S1.

The second sub-electrode 222 is spaced apart from the first sub-electrode 221. The space part D may be interposed between the first and second sub-electrodes 221 and 222. The second sub-electrode 222 may be provided at the opposite side of the instruction icon 400. The second sub-electrode 222 may be spaced apart from the instruction icon 400. The second sub-electrode 222 may not be overlapped with the instruction icon 400, or may not make contact with the instruction icon 400.

The second sub-electrode 222 may extend in the longitudinal direction in the drawing, and the first sub-electrode 221 may extend in the transverse direction in the drawing. A bridge electrode 225 may be additionally provided to connect the first sub-electrode 221 with the second sub-electrode 222. The bridge electrode 225 may be provided at the space part D interposed between the first and second sub-electrodes 221 and 222.

An insulating part 300 may be additionally provided to cover at least a portion of the instruction sensing electrode 220. The insulating part 300 and the bridge electrode 225 may be partially provided at portions of the first and second sub-electrodes 221 and 222. The insulating part 300 may be provided on the second instruction sensing electrode 224, and the bridge electrode 225 may be provided on the insulating part 300. The first instruction sensing electrode 223 can be prevented from being shorted with respect to the second instruction sensing electrode 224.

The bridge electrode 225 may be spaced apart from the instruction icon 400. The bridge electrode 225 may be provided at an outer portion of the instruction icon 400. The bridge electrode 225 may be overlapped with the instruction icon 400.

The bridge electrode 225 can be prevented from being cracked or disconnected due to the thickness of the instruction icon 400. In other words, according to the related art, since the bridge electrode 225 formed in the third area IA is overlapped with the instruction icon 400, the bridge electrode 225 is disconnected due to the step difference from the instruction icon 400. According to the present embodiment, the bridge electrode 225 may be prevented from being disconnected due to the step difference from the instruction icon 400. The quality of the touch window can be improved, and the yield rate of the touch window can be improved.

The electrode 200 may include at least one of indium tin oxide (ITO), indium zinc oxide (IZO), a zinc oxide (ZnO), a carbon nanotube (CNT), an Ag-nanowire, conductive polymer, and graphene.

The instruction icon 400 is provided in the third area IA. The instruction icon 400 is provided at areas other than a main display part for user convenience so that additional instructions may be input.

Figure 6:
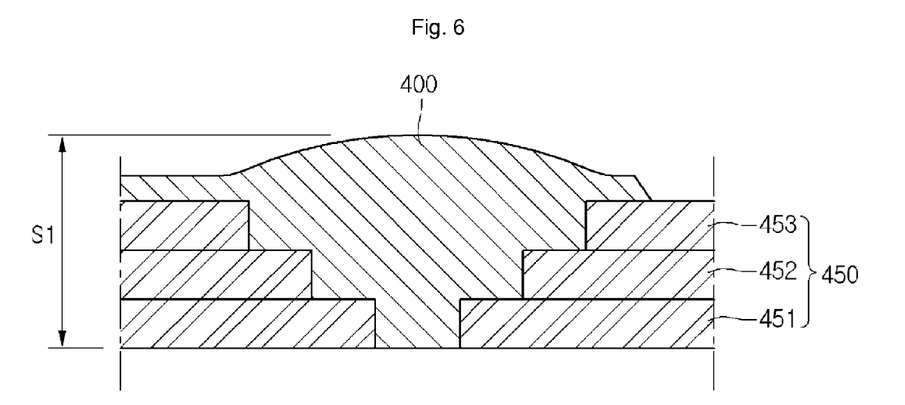
FIGS. 6 and 7 are sectional views taken along line 11-11'.
Figure 7:
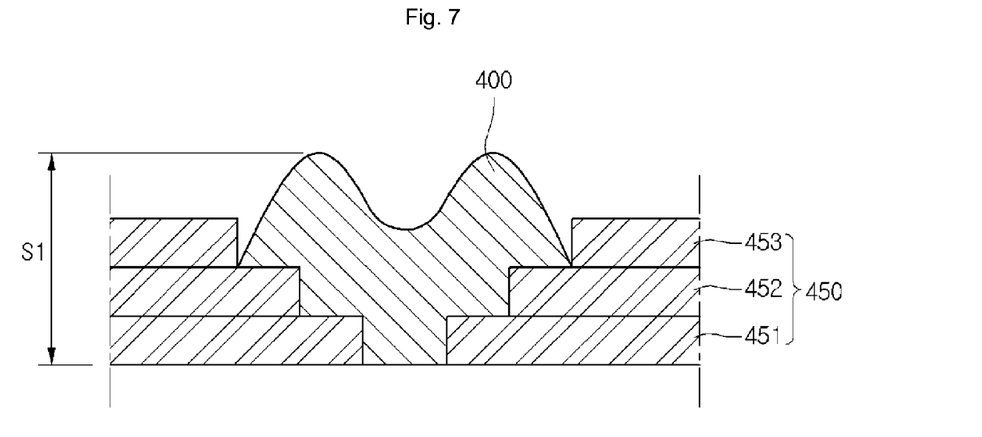

Referring to FIGS. 6 and 7, the instruction icon 400 may be provided on the printing layer 450. The printing layer 450 may be formed through single tone printing, double tone printing or three tone printing. The instruction icon 400 may be formed on the printing layer 450 through a printing process. The instruction icon 400 may protrude from the printing layer 450 to form the step difference S1 as shown in FIG. 6. In addition, the embodiment is not limited thereto, and the instruction icon 400 may be recessed from the printing layer 400 to form the step difference S1 as shown in FIG. 7.

The instruction icon 400 may represent a color suitable for the outer appearance. The instruction icon 400 may include pigments representing a color. The instruction icon 400 may be formed by semi-transparent ink or opaque ink. For example, the instruction icon 400 may represent a color contrasted with that of the printing layer 450. In other words, the instruction icon 400 may represent a color different from that of the printing layer 450 so that the instruction icon 400 can be distinguished from the printing layer 450.

The thickness of the instruction icon 400 may be in the range of about 0.1 µm to about 5 µm. The instruction icon 400 may protrude from the printing layer 450 to form the step difference S1. The instruction icon 400 may be recessed from the printing layer 400 to form the step difference S1. The step difference S1 between the printing layer 450 and the instruction icon 400 may be in the range of 7 µm to 15 µm.

Figure 4:
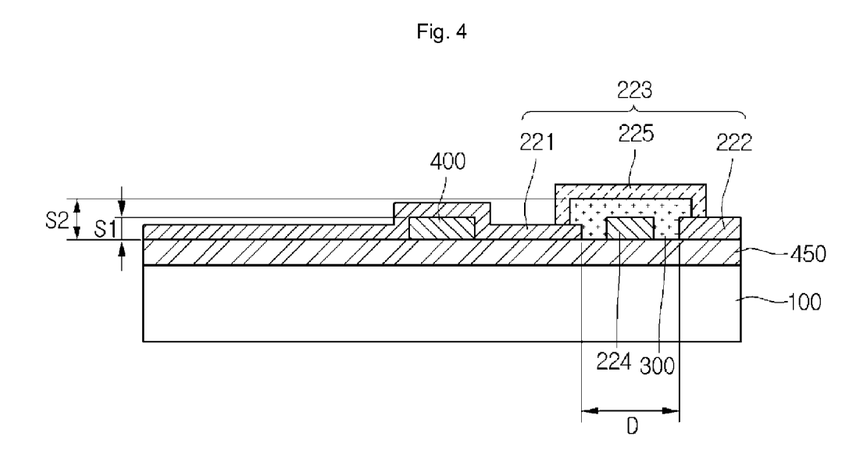
FIG. 4 is a sectional view taken along line I-I' of FIG. 3.
Figure 5:
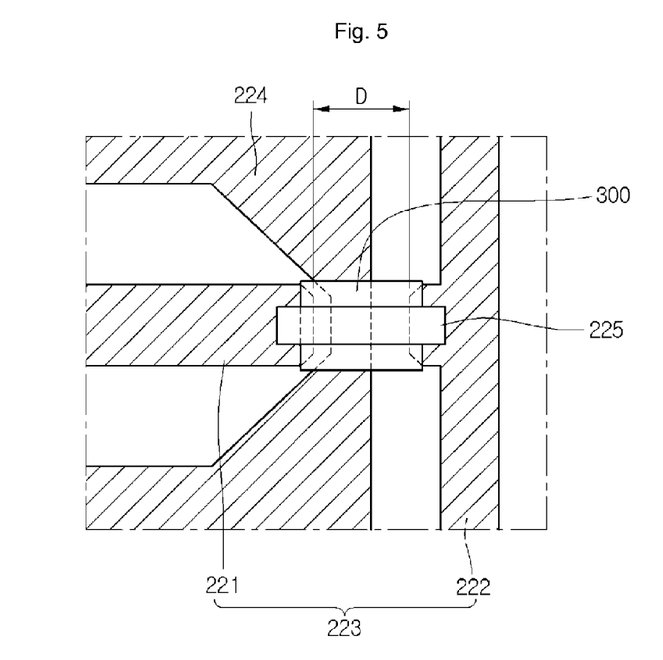
FIG. 5 is an enlarged view showing a part C of FIG. 3.

Referring to FIG. 4, the step difference S1 between the printing layer 450 and the instruction icon 400 is greater than the step difference S2 between the printing layer 450 and the insulating part 300. When the insulating part 300 and the bridge electrode 225 are overlapped with the printing layer 450, the quality of the instruction sensing electrode 220 may be degraded due to the high step difference (S1+S2).

Figure 8:
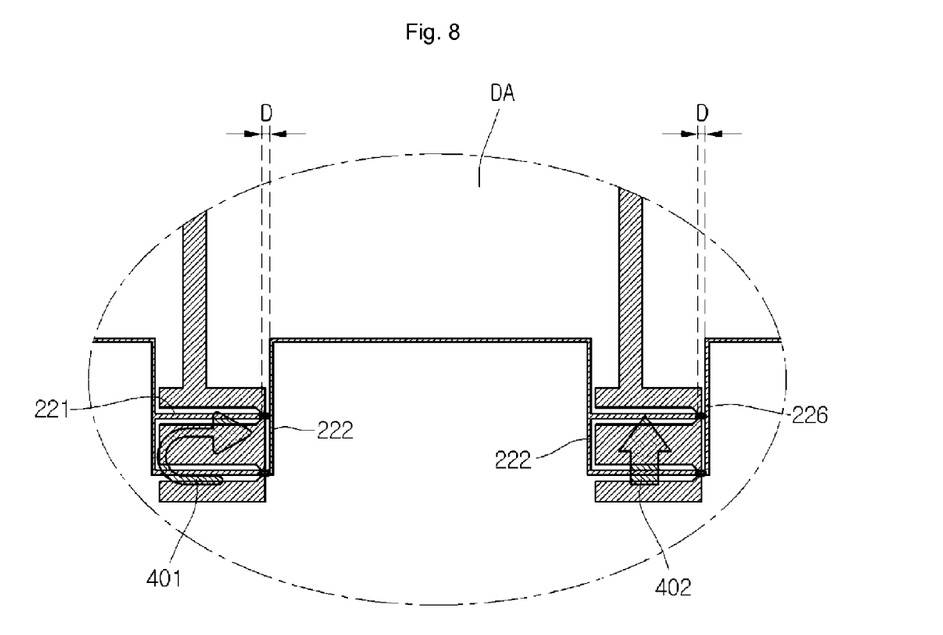
FIG. 8 is an enlarged view showing a part D of FIG. 1.

Referring to FIG. 8, the second instruction icon 402 may be additionally provided in the second area DA. The second sub-electrode 222 extends to be overlapped with a portion of the second instruction icon 402, thereby sensing the touch onto the second instruction icon 402. A third sub-electrode 226 may be additionally provided to form a capacitor together with the second sub-electrode 222, and to be spaced apart from the second sub-electrode 222 while interposing the space part D between the third sub-electrode 226 and the second sub-electrode 222. The third sub-electrode 226 is connected with the second sub-electrode 222 at the outer portion of the additional instruction icon. As described above, the second and third sub-electrodes 222 and 226 may be connected with the outer portion of the second instruction icon 402 through the bridge electrode and the insulating part.

Figure 9:
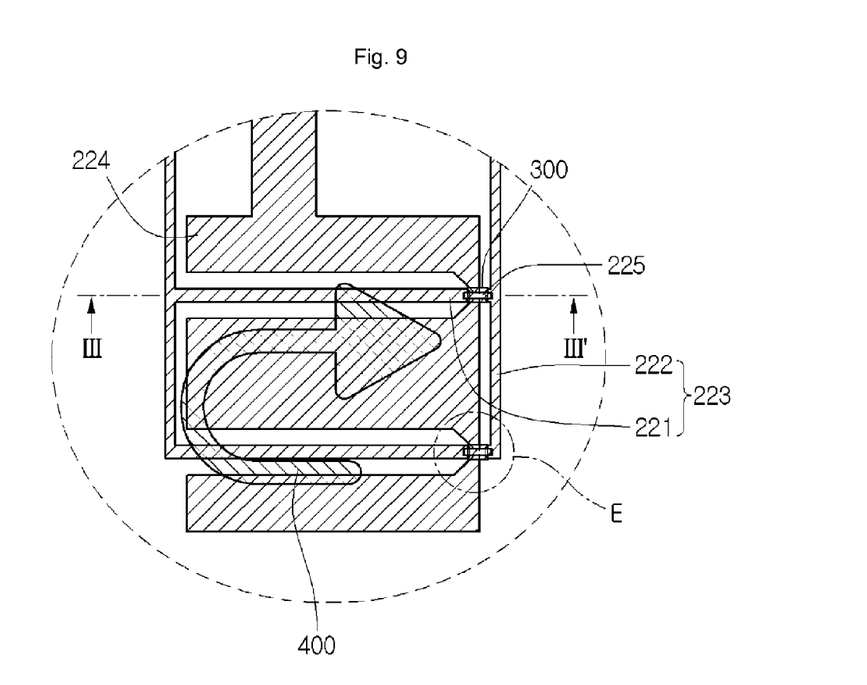
FIG. 9 is an enlarged view showing a touch window according to another embodiment.
Figure 10:
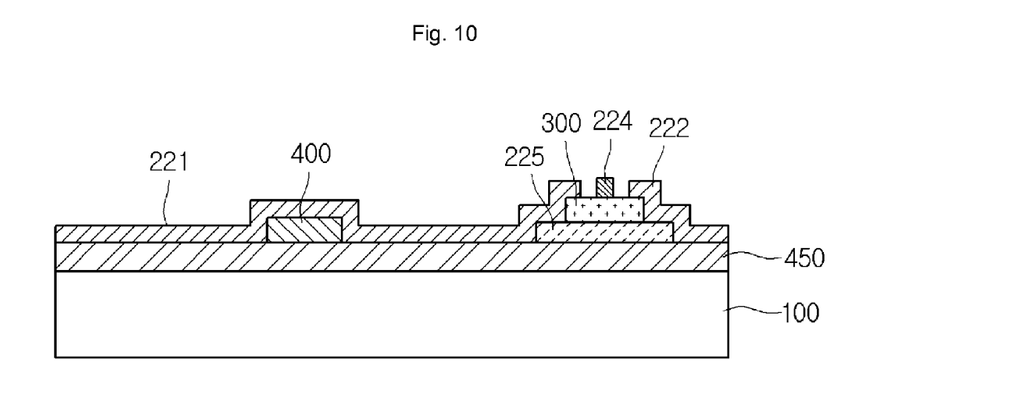
FIG. 10 is a sectional view taken along line III-III" of FIG. 9.
Figure 11:
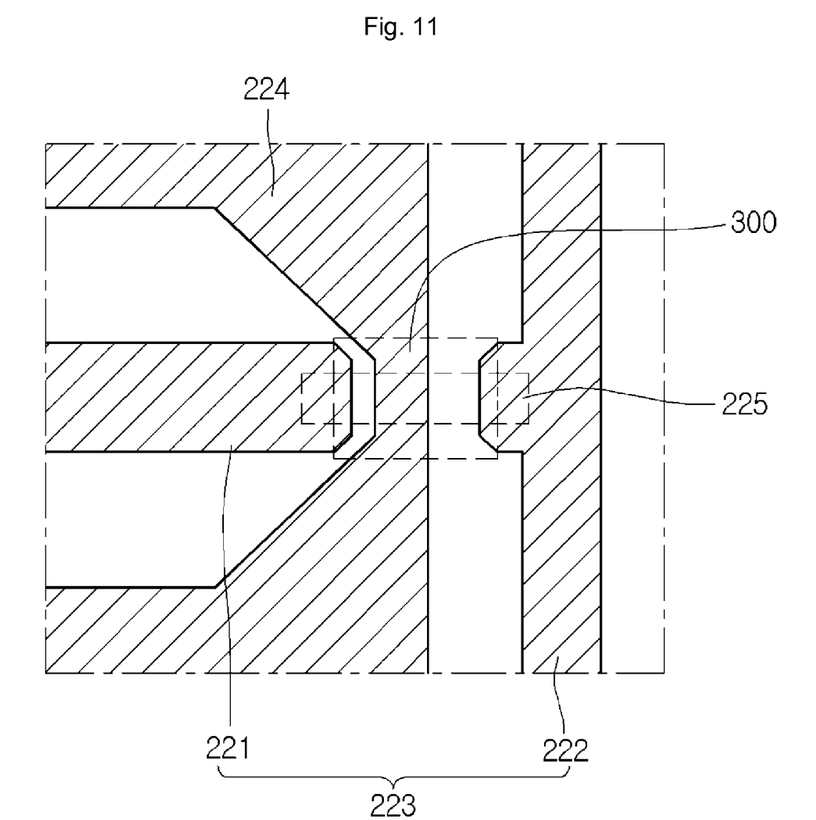
FIG. 11 is an enlarged view showing a part E of FIG. 9.

Referring to FIGS. 9 to 11, a stack-up structure different from the above-described structure may be provided. In other words, the bridge electrode 225, the insulating part 300, the first instruction sensing electrode 223, and the second instruction sensing electrode 224 may be sequentially stacked up on the printing layer 450. The first and second sub-electrodes 221 and 222 may be provided on the insulating part 300 and the bridge electrode 225.

Figure 13:
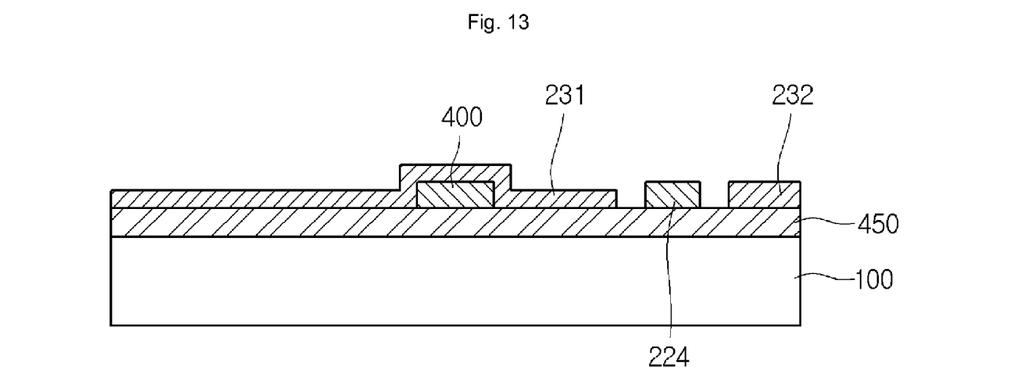
FIG. 13 is a sectional view taken along line IV-IV' of FIG. 12.
Figure 14:
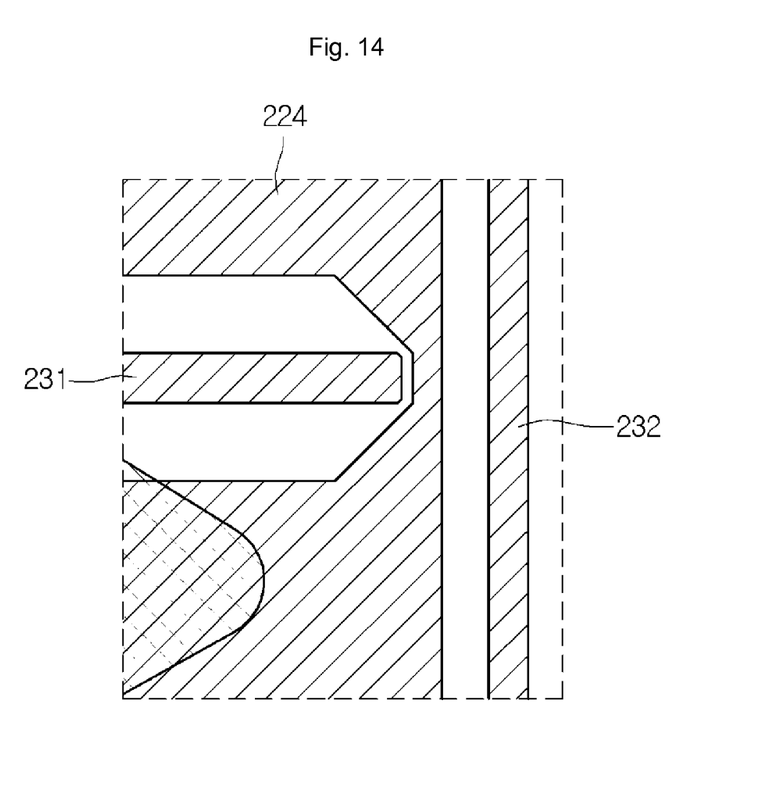
FIG. 14 is an enlarged view showing a part F of FIG. 12.

Hereinafter, a touch window according to another embodiment will be described with reference to FIGS. 12 to 14, and the details of the same structure and components as those described above may not be further described for the convenience of clear and simple explanation.

Figure 12:
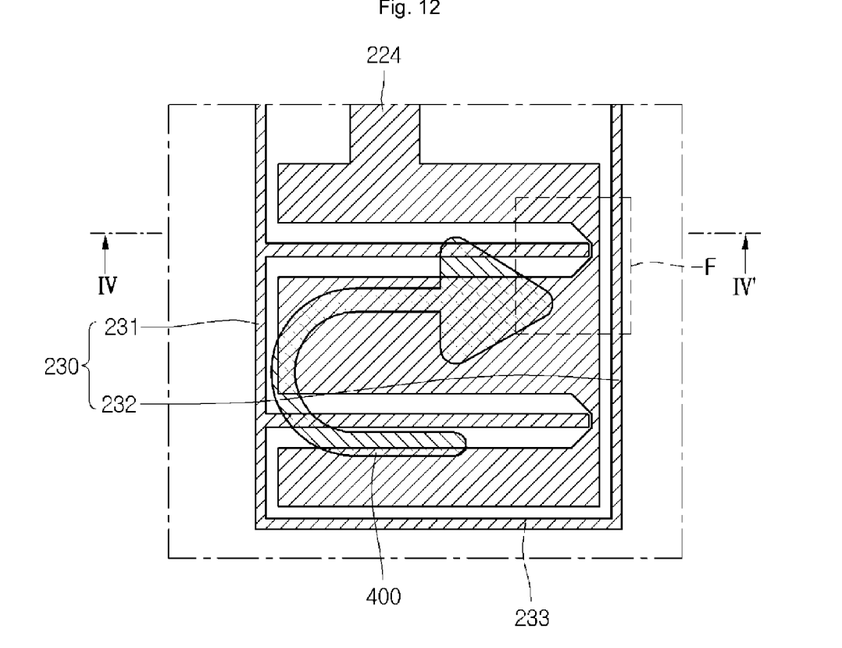
FIG. 12 is an enlarged view showing a touch window according to still another embodiment.

Referring to FIG. 12, a connection electrode 233 may connect one terminal of the first sub-electrode 231 to one terminal of the second sub-electrode 232. The connection electrode 233 may be formed integrally with the first and second sub-electrodes 231 and 232. The connection electrode 233 may be spaced apart from the second instruction sensing electrode 224. The connection electrode 233 may not be overlapped with the second instruction sensing electrode 224.

Differently from the first embodiment, the insulating part 33 (see FIG. 3) interposed between the first instruction sensing electrode 223 and the second instruction sensing electrode 224 may be omitted. Although the connection part 225 (see FIG. 3) according to the first embodiment has a bridge shape, the connection electrode 233 according to the second embodiment may have a different shape. The connection electrode 233 according to the second embodiment may extend by detouring the instruction icon 400.

Figure 15:
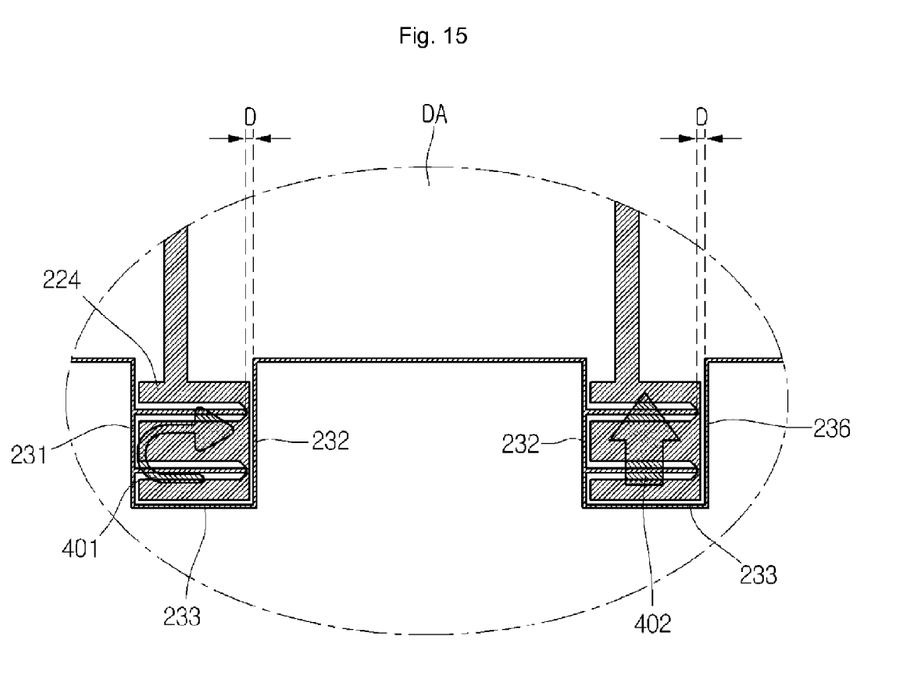
FIGS. 15 and 16 are enlarged views showing a touch window according to still another embodiment.

Referring to FIG. 15, a second instruction icon 402 may be additionally provided in a second region DA. The second sub-electrode 232 extends so that the second sub-electrode 232 is overlapped with at least a portion of the second instruction icon 402, thereby sensing the touch onto the second instruction icon 402. The third sub-electrode 226 may be additionally provided to form a capacitor together with the second sub-electrode 222, and to be spaced apart from the second sub-electrode 222 while interposing the space part D between the third sub-electrode 226 and the second sub-electrode 222. The third sub-electrode 226 is connected with the second sub-electrode 222 at the outer portion of the additional instruction icon. As described above, the second and third sub-electrodes 222 and 226 may be connected with the outer portion of the second instruction icon 402 through the connection electrode 233.

The connection electrode 233 may connect one terminal of the first sub-electrode 231 with one terminal of the second sub-electrode 232. In addition, the connection electrode 233 may connect one terminal of the second sub-electrode 232 with one terminal of the third sub-electrode 236. The connection electrode 233 may connect the first sub-electrode 231 with the second sub-electrode 232 at an area other than the space part D, and may connect the second sub-electrode 232 with the third sub-electrode 236 at an area other than the space part D.

The connection electrode 233 may be formed integrally with the first to third sub-electrodes 231, 232, and 236. The connection electrode 233 may be spaced apart from the second instruction sensing electrode 224. The connection electrode 233 may not be overlapped with the second instruction sensing electrode 224. In other words, the connection electrode 233 may extend by detouring the instruction icon 400.

Figure 16:
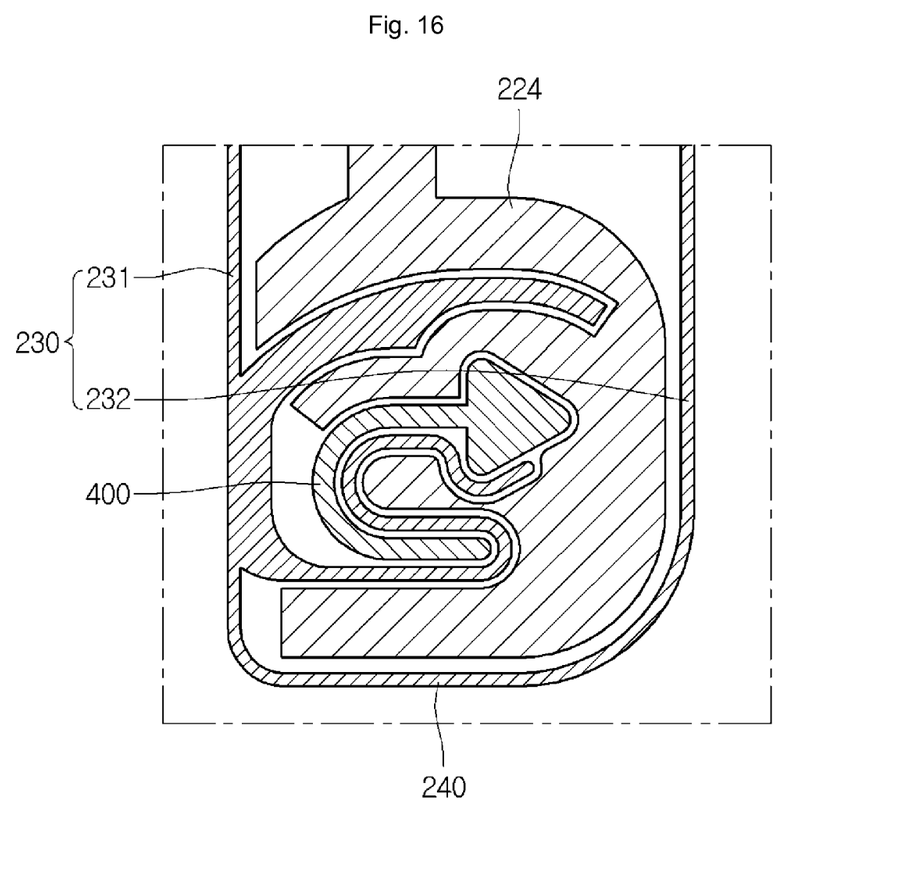

Referring to FIG. 16, the touch window according to still another embodiment includes a first instruction sensing electrode 230 and a second instruction sensing electrode 240. The first instruction sensing electrode 230 and the second instruction sensing electrode 240 are provided on the third area IA, and may be spaced apart from the instruction icon 400. Both of the first and second instruction sensing electrodes 230 and 240 may be spaced apart from the instruction icon 400. The first and second instruction sensing electrodes 230 and 240 may be provided at an outer portion of the instruction icon 400. The first and second instruction sensing electrodes 230 and 240 may be provided along an edge of the shape of the instruction icon 400. The second instruction sensing electrode 240 may not be overlapped with the instruction icon 400.

The second instruction sensing electrode 240 may be connected with the first instruction sensing electrode 230. The second instruction sensing electrode 240 may be formed integrally with the first instruction sensing electrode 230.

The embodiment provides a touch window having improved reliability.

According to the embodiment, there is provided a touch window including a cover substrate including a first area, in which a screen image is displayed, and a second area provided at an edge of the first area, a sensing electrode to sense a touch position in the first area, a printing layer positioned in the second area, an instruction icon provided in the second area such that the instruction icon has a step difference from the printing layer, and an instruction sensing electrode to recognize a touch position of the instruction icon. The instruction sensing electrode includes a first instruction sensing electrode, and a second instruction sensing electrode to form a capacitor together with the first instruction sensing electrode. The first instruction sensing electrode includes a first sub-electrode and a second sub-electrode spaced apart from the first sub-electrode while interposing a space part between the first and second sub-electrodes, and the first and second sub-electrodes are connected with each other at an outer portion of the instruction icon.

As described above, according to the touch window of the embodiment, the instruction sensing electrode can be prevented from being cracked or disconnected due to the difference in thickness between the instruction sensing electrode and the instruction icon. In other words, according to the related art, the bridge electrode formed in an area where an icon is formed and the instruction icon are overlapped with each other, so that the bridge electrode or the instruction sensing electrode has a disconnected part due to the step difference from the instruction icon. According to the embodiment, the crack or the disconnection can be prevented. Therefore, the quality of the touch window can be improved and the yield rate of the touch window can be improved.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
    a cover substrate including a first area, in which a screen image is displayed, and a second area provided adjacent to the first area;
    a sensing electrode configured to sense a touch position in the first area;
    a printing layer in the second area;
    an instruction icon in the second area such that the instruction icon has a step difference from the printing layer; and
    an instruction sensing electrode to recognize a touch position of the instruction icon,
    wherein the instruction sensing electrode includes:
        a first instruction sensing electrode; and
        a second instruction sensing electrode to form a capacitor together with the first instruction sensing electrode, the first instruction sensing electrode including:
            a first sub-electrode and a second sub-electrode spaced apart from the first sub-electrode to form a gap between the first sub-electrode and the second sub-electrode, the first and second sub-electrodes being connected with each other at an outer portion of the instruction icon, and
            a bridge electrode provided at the gap between the first sub-electrode and the second sub-electrode,
        wherein the instruction sensing electrode and the instruction icon are disposed on the printing layer, and
        wherein the bridge electrode is disposed on the second area.

2. The touch window of claim 1, wherein at least a portion of the instruction sensing electrode is overlapped with at least a portion of the instruction icon.

3. The touch window of claim 2, wherein at least a portion of the instruction sensing electrode is provided on the printing layer and the instruction icon while crossing the step difference.

4. The touch window of claim 1, wherein the instruction icon protrudes from the printing layer to form the step difference.

5. The touch window of claim 1, wherein the instruction icon is recessed from the printing layer to form the step difference.

6. The touch window of claim 1, further comprising an additional instruction icon in the second area, the second sub-electrode extending such that the second sub-electrode is overlapped with at least a portion of the additional instruction icon to sense a touch of the additional instruction icon.

7. The touch window of claim 6, further comprising a third sub-electrode, forming a capacitor together with the second sub-electrode, spaced apart from the second sub-electrode to form a gap between the third sub-electrode and the second sub-electrode, and connected with the second sub-electrode at an outer portion of the additional instruction icon.

8. The touch window of claim 7, further comprising a connection electrode to connect the first sub-electrode with the second sub-electrode at a position that differs from the gap between the first sub-electrode and the second sub-electrode, and to connect the second sub-electrode with the third sub-electrode at a position that differs from the gap between the second sub-electrode and the third sub-electrode.

9. The touch window of claim 1, wherein the second instruction sensing electrode extends from the sensing electrode.

10. The touch window of claim 1, wherein the first instruction sensing electrode is separated from the sensing electrode.

11. The touch window of claim 1, wherein the bridge electrode is provided at the outer portion of the instruction icon.

12. The touch window of claim 1, wherein the second sub-electrode is spaced apart from the instruction icon.

13. The touch window of claim 1, further comprising an insulating part provided on the bridge electrode, wherein the first sub-electrode and the second sub-electrode are provided on the insulating part and the bridge electrode.

14. The touch window of claim 1, further comprising an insulator to cover at least a portion of the instruction sensing electrode, wherein the bridge electrode is provided on the insulator.

15. The touch window of claim 1, further comprising a connection electrode to connect the first sub-electrode with the second sub-electrode at a part other than the gap.

16. The touch window of claim 15, wherein the connection electrode is formed integrally with the first and second sub-electrodes.

17. The touch window of claim 16, wherein the connection electrode is provided at the outer portion of the instruction icon.

18. A touch window comprising:
a cover substrate including a first area in which a screen image is displayed, a second area provided at an edge of the first area, and a third area provided at a portion of the second area;
a sensing electrode to sense a touch position in the first area;
a printing layer in the second area;
an instruction icon provided in the second area such that the instruction icon has a step difference from the printing layer; and
an instruction sensing electrode to recognize a touch position of the instruction icon,
wherein an entire portion of the instruction sensing electrode is spaced apart from the instruction icon,
wherein the instruction sensing electrode and the instruction icon are disposed on the printing layer,
wherein the instruction sensing, electrode includes a first instruction sensing electrode and a second instruction sensing electrode provided in the third area,
wherein the second instruction sensing electrode is connected to the first instruction sensing electrode, and
wherein the second instruction sensing electrode is formed integrally with the first instruction sensing electrode.

19. The touch window of claim 18, wherein the instruction sensing electrode is provided along an edge of the instruction icon.

* * * * *